United States Patent
Wu et al.

(10) Patent No.: US 10,200,694 B2
(45) Date of Patent: Feb. 5, 2019

(54) METHOD AND APPARATUS FOR RESPONSE OF FEEDBACK INFORMATION DURING VIDEO CALL

(71) Applicant: MediaTek Inc., Hsin-Chu (TW)

(72) Inventors: Tung-Hsing Wu, Chiayi (TW); Li-Heng Chen, Tainan (TW); Han-Liang Chou, Baoshan Township, Hsinchu County (TW)

(73) Assignee: MEDIATEK INC., Hsin-Chu (TW)

( * ) Notice: Subject to any disclaimer, the term of this patent is extended or adjusted under 35 U.S.C. 154(b) by 159 days.

(21) Appl. No.: 15/229,506

(22) Filed: Aug. 5, 2016

(65) Prior Publication Data

US 2017/0085888 A1    Mar. 23, 2017

Related U.S. Application Data

(60) Provisional application No. 62/219,792, filed on Sep. 17, 2015.

(51) Int. Cl.
| | |
|---|---|
| *H04N 19/164* | (2014.01) |
| *H04N 19/172* | (2014.01) |
| *H04L 1/00* | (2006.01) |
| *H04L 12/26* | (2006.01) |
| *H04N 19/159* | (2014.01) |
| *H04N 19/107* | (2014.01) |
| *H04N 19/15* | (2014.01) |

(Continued)

(52) U.S. Cl.
CPC ......... *H04N 19/164* (2014.11); *H04L 1/0018* (2013.01); *H04L 43/16* (2013.01);
(Continued)

(58) Field of Classification Search
CPC .................................................. H04N 19/164
See application file for complete search history.

(56) References Cited

U.S. PATENT DOCUMENTS

| | | | |
|---|---|---|---|
| 5,109,651 A | 5/1992 | Stuart | |
| 2003/0016755 A1* | 1/2003 | Tahara | H04N 19/10 375/240.25 |

(Continued)

FOREIGN PATENT DOCUMENTS

| | | |
|---|---|---|
| CN | 1210962 | 7/2005 |
| EP | 2 274 914 | 10/2009 |
| WO | WO 2012/003808 | 1/2012 |

OTHER PUBLICATIONS

Wang, Y.K., et al.; "Error Resilient Video Coding Using Flexible Reference Frames;" Visual Communications and Image Processing; Jul. 12, 2005; pp. 691-702.

(Continued)

*Primary Examiner* — Tracy Y. Li
(74) *Attorney, Agent, or Firm* — McClure, Qualey & Rodack, LLP

(57) ABSTRACT

A method and apparatus of encoding frames with a frame type structure adaptively according to a current encoding status after receiving a request for an IDR frame or receiving an indication of picture data loss are disclosed. If the check result of the current encoding status is true, the second frame type structure is the same as the first frame type structure; and if the check result of the current encoding status is false, the second frame type structure is different from the first frame type structure. Another method and apparatus of encoding frames with a reference frame structure and a frame type structure adaptively according to one or more current encoding statuses after receiving an indication of picture data loss are disclosed. The system may use two different check results to adaptively select the reference frame structure and the frame type structure.

26 Claims, 5 Drawing Sheets

(51) Int. Cl.
*H04N 19/114* (2014.01)
*H04N 19/65* (2014.01)
*H04N 19/89* (2014.01)

(52) U.S. Cl.
CPC ......... *H04N 19/107* (2014.11); *H04N 19/114* (2014.11); *H04N 19/15* (2014.11); *H04N 19/159* (2014.11); *H04N 19/172* (2014.11); *H04N 19/65* (2014.11); *H04N 19/89* (2014.11)

(56) References Cited

U.S. PATENT DOCUMENTS

| | | | |
|---|---|---|---|
| 2005/0008240 A1* | 1/2005 | Banerji | H04N 5/2624 |
| | | | 382/238 |
| 2009/0252227 A1 | 10/2009 | NepomucenoLeung et al. | |
| 2012/0016965 A1* | 1/2012 | Chen | H04N 21/23439 |
| | | | 709/219 |
| 2012/0179833 A1* | 7/2012 | Kenrick | H04N 21/234309 |
| | | | 709/231 |
| 2014/0096165 A1* | 4/2014 | Bei | H04N 19/46 |
| | | | 725/81 |

OTHER PUBLICATIONS

Fukunaga, S., et al.; "Error Resilient Video Coding by Dynamic Replacing of Reference Pictures;" IEEE; Nov. 18, 1996; pp. 1503-1508.

Zhu, C., et al.; "Error Resilient Video Coding Using Redundant Pictures;" IEEE Transactions on Circuits and Systems for Video Technology; vol. 19; No. 1; Jan. 2009; pp. 3-14.

* cited by examiner

US 10,200,694 B2

METHOD AND APPARATUS FOR RESPONSE OF FEEDBACK INFORMATION DURING VIDEO CALL

CROSS REFERENCE TO RELATED APPLICATIONS

The present invention claims priority to U.S. Provisional Patent Application, Ser. No. 62/219,792, filed on Sep. 17, 2015. The U.S. Provisional Patent Application is hereby incorporated by reference in its entirety.

FIELD OF THE INVENTION

The present invention relates to handling feedback information from a decoder during a video call. In particular, the present invention relates to method and apparatus to respond adaptively to the feedback information from a decoder.

BACKGROUND AND RELATED ART

In recent years, video communication over network environment, such as Internet, has been an important application. For example, video conferencing can be conducted over various networks. In network transmission, the bandwidth of multimedia data should be stable in order to keep transmission smooth. Nevertheless, for a video bitstream, the bitstream size of each frame varies according to various factors, such as frame type, frame contents, and quantization parameter (QP). For the frame type, it may be an Intra coded frame or Inter coded frame, where an Intra coded frame often generated much a high bit count than a typical Inter coded frame. For frame contents, high-frequency frame contents often result in a higher bit count than low-frequency frame contents. For quantization parameter, a larger quantization parameter will result in higher video quality at the expense of a higher bit count. Furthermore, the bit rate is also related to coding efficiency of the video standard applied.

In video coding, Intra coded frame usually is used once a while or whenever needed. For example, Intra frame may be sent periodically (e.g. every 30 frames) or when a scene change occurs. An Intra coded frame will induces large fluctuation of network bandwidth. Accordingly, Intra coded frame is not favored and the number of Intra coded frame should be reduced.

For compressed video, the video quality suffers from the network transmission errors due to the use of Inter frame coding and the use of variable length coding. The Inter frame coding will cause transmission errors to propagate from frame to frame. Therefore, the use of Intra coded frame can constrain the error propagation due to Inter frame coding. On the other hand, any error in the bitstream may cause variable length codes to lose sync.

Since the Intra coded frames often result in a higher data rate, the mechanism of sending Intra coded frame has to be controlled carefully in order to avoid possible visual quality degradation due to network transmission issues. In order to address the issue, various multimedia transport technologies have been developed. For example, in IETF RFC 4585 (J. Ott et al., *Extended RTP Profile for Real-time Transport Control Protocol (RTCP)-Based Feedback (RTP/AVPF)*, Internet Engineering Task Force, Request for Comments: 4585, July 2006), an extension to the Audio-visual Profile (AVP) is defined that enables receivers to provide, statistically, more immediate feedback to the senders. Thus the technique allows for short-term adaptation and efficient feedback-based repair mechanisms to be implemented. Furthermore, IETF RFC 5104 (S. Wenger et al., *Codec Control Messages in the RTP Audio-Visual Profile with Feedback (AVPF)*, Internet Engineering Task Force, Request for Comments: 5104, February 2008) specifies a few extensions to the messages defined in the Audio-Visual Profile with Feedback (AVPF), which are helpful primarily in conversational multimedia scenarios, where centralized multipoint functionalities are used.

AVPF allows feedback information during a video call. AVPF can be used for Real-time Transport Control Protocol (RTCP), also called RTP/AVPF. The AVPF protocol results in low latency feedback. The feedback messages from a decoder to an encoder include Full Intra Request (FIR) that requests the media sender to send a Decoder Refresh Point at the earliest opportunity. The feedback information also includes Payload-Specific Feedback Messages such as Picture Loss Indication (PLI) and Slice Loss Indication (SLI). For PLI, a decoder may inform an encoder about the loss of an undefined amount of coded video data belonging to one or more pictures by signaling PLI. For SLI, a decoder may inform an encoder that it has detected the loss or corruption of one or several consecutive macroblock(s) in a scan order.

For the feedback message, it has transmission latency between the transmitter device and the receiver device. On the transmitter side, the transmitter device transmits the feedback message to the receiver device. At the receiver side, the receiver device receives the feedback message from the transmitter device. If the transmitter device transmits the first feedback message at time T1 and the receiver device receives the first feedback message at time T2, then the relation of time T1 and T2 should satisfy the condition, T1<T2. In other words, the receiver device receives the first feedback message after the transmitter device transmits the first feedback message. The transmission latency is determined according to (T2−T1).

BRIEF SUMMARY OF THE INVENTION

A method and apparatus of encoding frames with a frame type structure adaptively according to a current encoding status after receiving a request for an IDR frame (an Intra frame with decoder refresh point) or receiving an indication of picture data loss are disclosed. If the check result of the current encoding status is true, the second frame type structure is the same as the first frame type structure; and if the check result of the current encoding status is false, the second frame type structure is different from the first frame type structure. For example, if a transmission latency of receiving the request for the IDR frame, a transmission latency of receiving the indication of picture data loss, or a current bitrate available for video bitstream is smaller than a threshold, the check result of the current encoding status is true, and otherwise the check result of the current encoding status is false.

In one embodiment, if a frame interval or time interval of a minimum frame period of Intra frames, a frame interval or time interval of a next Intra frame, or a frame interval or time interval of a previous Intra frame is smaller than a threshold, the check result of the current encoding status result is true, and otherwise the check result of the current encoding status is false. The Intra frame here may correspond to one Intra frame with or without a decoder refresh point. The check result of the current encoding status can be determined by comparing the current encoding status with a threshold, and where the threshold is set to a value before encoding one frame and remain constant during encoding one frame. The check result of the current encoding status may also always set to true.

In one embodiment, the first frame type structure comprises Intra frames and predictive-coded (P) frames, and wherein the Intra frames have a minimum Intra period, or both the minimum Intra period a maximum Intra period. The actual Intra frame period can be determined by a video encoder or an external device without information regarding the indication of picture data loss. The Intra frame here may correspond to one Intra frame with or without a decoder refresh point.

If the second frame type structure is different from the first frame type structure, the second frame type structure may correspond to changing one predictive-coded (P) frame prior to a next Intra frame according to the first frame type structure into an altered Intra frame and remaining frames according to the second frame type structure are encoded in a same way as the first frame type structure, wherein each next Intra frame or each altered Intra frame may correspond to one Intra frame with or without a decoder refresh point.

If the second frame type structure is different from the first frame type structure, the second frame type structure may correspond to changing one predictive-coded (P) frame prior to a next Intra frame according to the first frame type structure into an altered Intra frame and encoding a next Intra after k frames from the altered Intra frame, and wherein k is larger than a minimum Intra frame period according to the first frame type structure, wherein each next Intra frame or each altered Intra frame may correspond to one Intra frame with or without a decoder refresh point.

Another method and apparatus of encoding frames with a reference frame structure and a frame type structure adaptively according to a current encoding status after receiving an indication of picture data loss are disclosed. The input frames are encoded with a second reference frame structure and a second frame type structure, where whether the second frame type structure is the same as the first frame type structure, whether the second reference frame structure is the same as the first reference frame structure, or whether the second frame type structure is the same as the first frame type structure and whether the second reference frame structure is the same as the first reference frame structure are based on one or more current encoding statuses. The system may use a first check result of current encoding statuses to determine whether the second frame type structure is the same as the first frame type structure and a second check result of current encoding statuses to determine whether the second reference frame structure is the same as the first reference frame structure. The derivation of the check result and the use of check result to adaptively select the second frame type structure as disclosed for the previous method are mostly applicable to this method as well.

The derivation of the second check result is similar to the first check result. In one embodiment, if one frame in a reference buffer list has possible decoding data corruption, the second check result is true. Otherwise, the second check result is false. In another embodiment, if a reference buffer list comprises a first frame group without possible decoding data corruption and a second frame group with said possible decoding data corruption and if a frame interval between a nearest frame in the first frame group and a current frame is larger than a threshold, the second check result is true. Otherwise, the second check result is false.

In one embodiment, when the second check result is false, a frame index before frames having possible decoding data corruption is determined, and one current second input frame is encoded without referencing to any frame having possible decoding data corruption. In another embodiment, frames having possible decoding data corruption can be a first frame set that contains one or more frames with the indication of picture data loss, a second frame set that contains one or more frames referencing to said one or more frames in the first frame set, a third frame set that contains one or more frames referencing to said one or more frames in the second frame set, a fourth frame set where one or more ancestor reference frames of one frame in the fourth frame set is one frame in the first frame set, or any combination thereof.

DETAILED DESCRIPTION OF THE INVENTION

Figure 1:
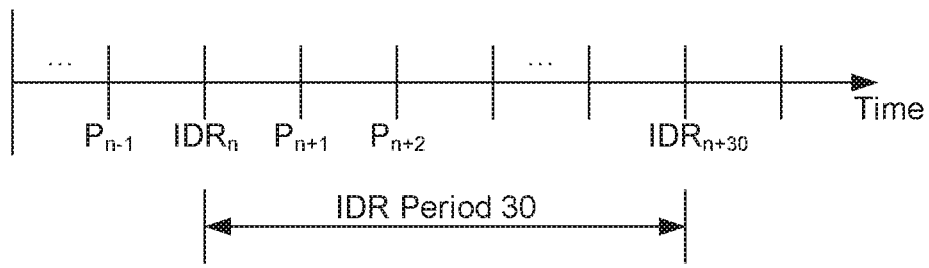
FIG. 1 illustrates an example of the first frame type structure with a fixed IDR frame period equal to 30 frames.

The following description is of the best-contemplated mode of carrying out the invention. This description is made for the purpose of illustrating the general principles of the invention and should not be taken in a limiting sense. The scope of the invention is best determined by reference to the appended claims.

As mentioned above, a smooth and stable video bitstream is more network-friendly to avoid potential quality degradation. One of the factors that may cause large variations in the bitrate is the use of Intra coded frames. Since the Intra coded frames often result in a bitrate or bit count substantially higher than the typical Inter-coded bitrate, bitrate spikes corresponding to the Intra coded frames will appear in the bitrate profile. These moments of high bitrate are more likely to cause network transmission issues, such as packet loss or excessive packet delay. When network transmission issues are present, a decoder may send feedback information to the encoder in order for the encoder to react and to alleviate the problem, such as retransmitting a frame. However, retransmission or transmission of a new frame, particularly an Intra coded frame would require a much higher bitrate than average. Therefore, to blindly retransmit or transmit a new frame by the encoder upon receiving feedback information from a decoder may not help to solve or alleviate the problem. The present invention discloses adaptive response to the decoder feedback information by the encoder according to the coding status.

First Embodiment

In this embodiment, the encoder is allowed to use at least two frame-type structures, a first frame type structure and a second frame type structure to encode frames. The first frame type structure includes at least one Intra frame (e.g. I frame) and one inter frame (e.g. P frame). The encoder may initially use the first frame type structure for normal operation. However, when the encoder receives feedback information indicating possible transmission problems from a decoder, the encoder may switch to the second frame type structure according to the current encoding status. In particular, the feedback information from a decoder corresponds to a request for Intra frame with decoder refresh point. The Intra frame with decoder refresh point is also called an IDR (Instantaneous Decoder Refresh) frame. An IDR coded picture, which is made up of I- or SI-slices, can be used to clear the contents of the reference picture buffer. All subsequent transmitted slices can be decoded without reference to any frame decoded prior to the IDR picture. In practice, the first picture in a coded video sequence is always an IDR picture. In this disclosure, when an Intra frame is mentioned without specific qualification, the Intra frame may correspond to an Intra frame with or without a decoder refresh point.

In a conventional video coding system, the encoder would transmit an IDR picture upon receiving the request for an IDR frame. As mentioned previously, the transmission of an IDR picture would result in a high bitrate, which may not help to resolve the network transmission issue. Accordingly, the embodiments of the present invention will check the encoding status and respond to the request accordingly.

The first frame type structure according to this embodiment supports Intra coded frames. In particular, the first frame type structure supports IDR frames. The arrangement of frame type will be used before the encoder receives the first request. For example, the first frame type structure may periodically include IDR frames with a minimum IDR frame period. FIG. 1 illustrates an example of the first frame type structure with a fixed IDR frame period equal to 30 frames. The video encoder will encode frames with periodic IDR frames. If $IDR_n$ is an IDR frame with frame index n, any picture with index (n+30 m) will be an IDR frame, where m is an integer. For any picture with index (n+k) and k≠30 m, the picture is a P frame.

In another example, a video encoder may encode frames with periodic IDR frames, wherein the minimum and maximum IDR frame periods are 25 and 30 frames respectively. The actual IDR frame period can be determined by the video encoder or assigned by an external device without the information of indication of picture data loss.

In yet another example, the video encoder will encode frames with only the first encoded frame as an IDR frame. In some embodiments, such condition may be implemented by setting the minimum IDR frame period to be infinite.

Upon receiving the request for an IDR frame from the decoder, the encoder will determine the second frame type structure according to the current encoding status. The encoder status will be checked and the check result will be used for determining the second frame type structure. For example, if the check result corresponds to a first condition (e.g. "true"), the second frame type structure is the same as the first frame type structure. If the check result corresponds to a second condition (e.g. "false"), the second frame type structure is different from the first frame type structure. The first condition may correspond to the check result being true and the second condition may correspond to the check result being false. Alternatively, the first condition may correspond to the check result being false and the second condition may correspond to the check result being true. In the following examples, the first condition corresponds to "true" and the second condition corresponds to "false". However, it is understood that these two conditions can be swapped. When the second frame type structure is the same as the first frame type structure, the scenario is equivalent to ignoring the request by the encoder.

Figure 2:
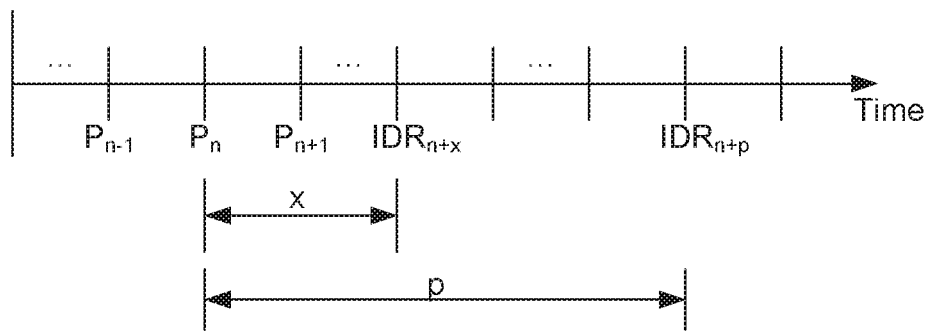
FIG. 2 illustrates an example, where an Inter frame $P_{n+x}$ is changed to an IDR frame, $IDR_{n+x}$.
Figure 3:
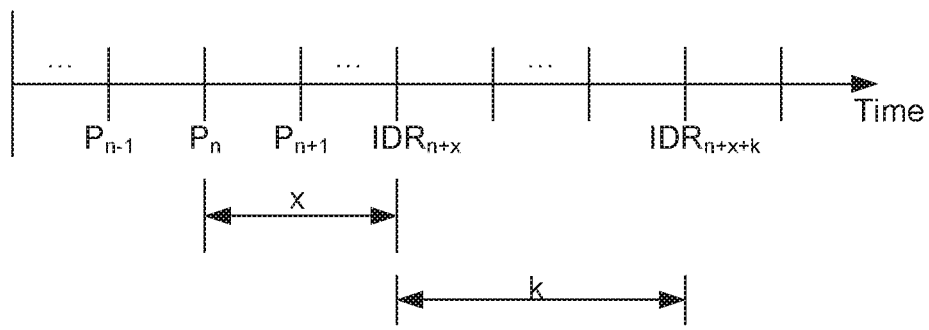
FIG. 3 illustrates another example, where an Inter frame $P_{n+x}$ is changed to an IDR frame, $IDR_{n+x}$ and the next IDR frame is $IDR_{n+x+k}$, wherein k>=minimum IDR period.

When the check result corresponds to the second condition (i.e., "false"), the second frame type structure is different from the first frame type structure. In this case, if the current encoding frame $P_n$ is an Inter frame and the next IDR frame is $IDR_{n+p}$, according to the first frame type structure, the encoder will use the second frame type structure to encode the next IDR frame at $IDR_{n+x}$, where x>=0, x<p, and x and p are positive integers. In other words, the encoder sends an IDR frame according to the second frame type structure earlier than the IDR frame according to the first frame type structure. Furthermore, frame (n+x) would have been coded as an Inter frame or an Intra frame without decoder refresh point according to the first frame type structure. FIG. 2 illustrates an example, where an Inter frame $P_{n+x}$ is changed to an IDR frame, $IDR_{n+x}$. The coding-type modified IDR frame in this example is referred as an altered IDR frame. FIG. 3 illustrates another example, where an Inter frame $P_{n+x}$ is changed to an IDR frame (i.e., an altered IDR frame), $IDR_{n+x}$ and the next IDR frame is $IDR_{n+x+k}$, wherein k>=minimum IDR period.

Various encoding statuses can be checked and used to determine the second frame type structure. For example, the status may correspond to whether the frame interval or the time interval of the minimum IDR period is smaller than a threshold. If the frame interval or the time interval of the minimum IDR period is smaller than the threshold, the check result is true (i.e., the first condition). Otherwise, the check result is false (i.e., the second condition). A proper threshold for the minimum Intra period can be selected.

In another example, the encoder status is related to a distance of the next IDR frame. Let the current frame index is n and the next IDR frame index is (n+u) according to the first frame type structure, where u is a positive integer. The encoder status corresponds to whether the distance or time interval of the next IDR frame is smaller than a threshold. If the distance or time interval of the next IDR frame is smaller than a threshold, the check result is true (i.e., the first condition). Otherwise, the check result is false (i.e., the second condition). As known in the field, the distance can be measured in terms of POC (picture order count). Therefore, the distance is equal to u. The time interval of the next IDR frame corresponds to frame time for the u frames. A proper threshold for the distance or time interval of the next IDR frame can be selected.

In yet another example, the encoding status is related to the previous IDR frame. Let the current frame index is n and the previous IDR frame index is (n−v) according to the first frame type structure, where v is a positive integer. The encoder status corresponds to whether the distance or time interval of the previous IDR frame is smaller than a threshold. If the distance or time interval of the previous IDR frame is smaller than a threshold, the check result is true (i.e., the first condition). Otherwise, the check result is false (i.e., the second condition). The distance can be measured in terms of POC (picture order count). Therefore, the distance is equal to v. The time interval of the next IDR frame corresponds to frame time for the v frames. A proper threshold for the distance or time interval of the previous IDR frame can be selected.

In yet another example, the encoding status is related to the transmission latency of the indication of picture data loss. If a request for an IDR frame is triggered due to decoding error in frame N and the encoder may be processing frame M, the transmission latency is the time between encoding frame N and frame M (i.e., M−N). If the transmission latency of the request for an IDR frame is smaller than a threshold, the check result is true (i.e., the first condition). Otherwise, the check result is false (i.e., the second condition). A proper threshold for the transmission latency of request for an IDR frame can be selected.

In yet another example, the encoding status is related to the current bitrate available for the video bitstream. If the current bitrate available for video bitstream is smaller than a threshold, the check result is true (i.e., the first condition). Otherwise, the check result is false (i.e., the second condition). A proper threshold for the current bitrate available for the video bitstream can be selected.

The encoder can initially set the check result to be true. The thresholds used in various examples above can be set before encoding a frame starts and these thresholds will stay the same during encoding a frame.

Second Embodiment

In this embodiment, the encoder is also allowed to use at least two frame-type structures, a first frame type structure and a second frame type structure, to encode frames. The first frame type structure includes at least one Intra frame (e.g. I frame) and one inter frame (e.g. P frame). The encoder may use the first frame type structure for normal operation. However, when the encoder receives feedback information from a decoder, the encoder may switch to the second frame type structure according to the current encoding status. In particular, the feedback information from a decoder corresponds to an indication of picture data loss. In one embodiment, the indication of picture data loss may be associated with the loss of an undefined/unknown amount of coded video data belonging to one or more pictures. In another embodiment, the indication of picture data loss may be associated with the loss of a defined/known amount of coded video data belonging to one or more pictures.

Figure 4:
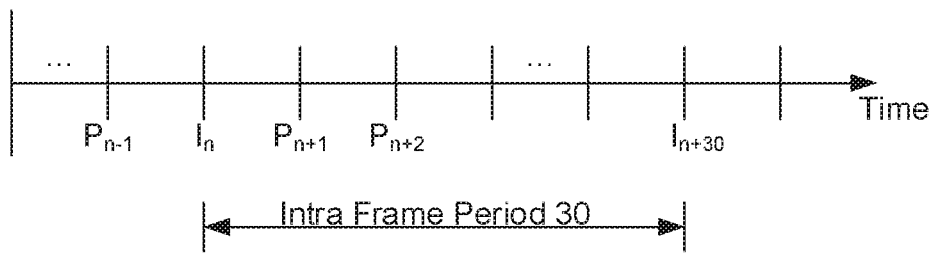
FIG. 4 illustrates an example of the first frame type structure with a fixed Intra frame period equal to 30 frames.

The first frame type structure according to this embodiment supports Intra coded frames. The arrangement of frame type will be used before the encoder receives the first request. For example, the first frame type structure may periodically include Intra frames with a minimum Intra frame period. FIG. 4 illustrates an example of the first frame type structure with a fixed Intra frame period equal to 30 frames. The video encoder will encode frames with periodic Intra frames. If $I_n$ is an Intra frame with frame index n, any picture with index (n+30 m) will be an Intra frame, where m is an integer. For any picture with index (n+k) and k≠30 m, the picture is a P frame.

In another example, a video encoder may encode frames with periodic Intra frames, wherein the minimum and maximum Intra frame periods are 25 and 30 frames respectively. The actual Intra frame period can be determined by the video encoder or assigned by an external device without the information of indication of picture data loss.

In yet another example, the video encoder will encode frames with only the first encoded frame as an Intra frame.

In some embodiments, such condition may be implemented by setting the minimum Intra frame period to be infinite.

Upon receiving the indication of picture data loss from the decoder, the encoder will determine the second frame type structure according to the encoder status. The encoder status will be checked and the check result will be used for determining the second frame type structure. For example, if the check result is true, the second frame type structure is the same as the first frame type structure. If the check result is false, the second frame type structure is different from the first frame type structure.

Figure 5:
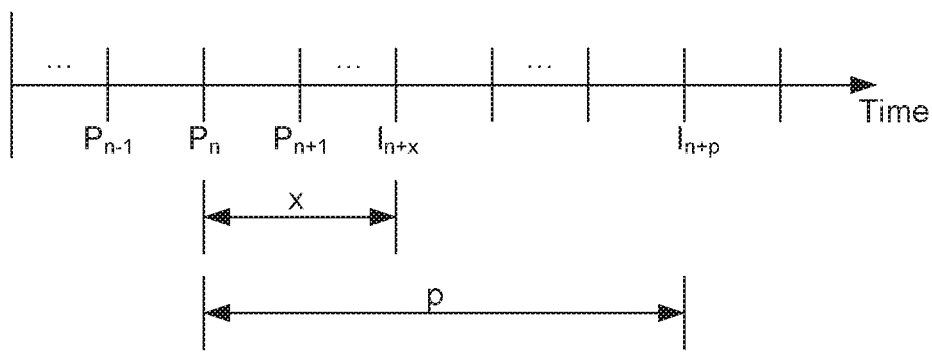
FIG. 5 illustrates an example, where an Inter frame $P_{n+x}$ is changed to an Intra frame, $I_{n+x}$.
Figure 6:
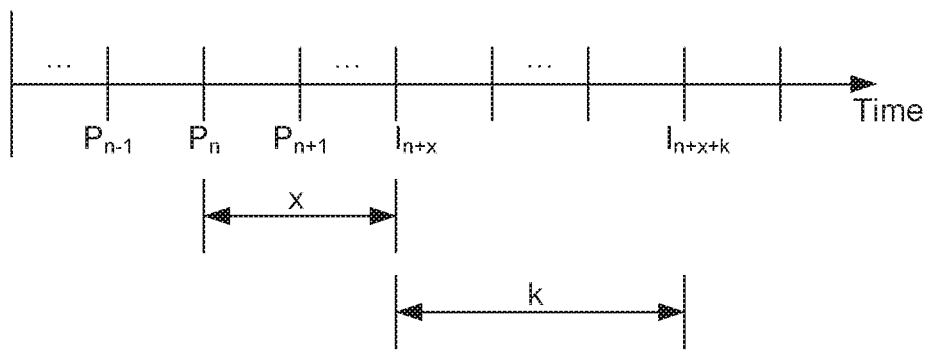
FIG. 6 illustrates another example, where an Inter frame $P_{n+x}$ is changed to an Intra frame, $I_{n+x}$ and the next Intra frame is $I_{n+x+k}$, wherein k>=minimum Intra frame period.

When the check result is false, the second frame type structure is different from the first frame type structure. In this case, if the current encoding frame $P_n$ is an Inter frame and the next Intra frame is $I_{n+p}$, according to the first frame type structure, the encoder will use the second frame type structure to encode the next Intra frame at $I_{n+x}$, where x>=0, x<p, and x and p are positive integers. In this example, the coding type of frame at (n+x) is changed from an Inter frame to an Intra frame. The coding-type modified frame according to the present invention is referred as an altered Intra frame. Furthermore, an altered Intra frame may correspond to an altered frame with a decoder refresh point (i.e., an altered IDR frame) or without a decoder refresh point. In other words, the encoder sends an Intra frame according to the second frame type structure earlier than the Intra frame according to the first frame type structure earlier. Furthermore, frame (n+x) would have been coded as an Inter frame according to the first frame type structure. FIG. 5 illustrates an example, where an Inter frame $P_{n+x}$ is changed to an Intra frame, $I_{n+x}$. FIG. 6 illustrates another example, where an Inter frame $P_{n+x}$ is changed to an Intra frame, $I_{n+x}$ and the next Intra frame is $I_{n+x+k}$, wherein k>=minimum Intra frame period.

Various encoding statuses can be checked and used to determine the second frame type structure. For example, the status may correspond to whether the frame interval or the time interval of the minimum Intra period is smaller than a threshold. If the frame interval or the time interval of the minimum Intra period is smaller than the threshold, the check result is true. Otherwise, the check result is false. A proper threshold for the minimum Intra period can be selected.

In another example, the encoder status is related to a distance of the next Intra frame. Let the current frame index is n and the next Intra frame index is (n+u) according to the first frame type structure, where u is a positive integer. The encoder status corresponds to whether the distance or time interval of the next Intra frame is smaller than a threshold. If the distance or time interval of the next Intra frame is smaller than a threshold, the check result is true. Otherwise, the check result is false. The distance can be measured in terms of POC (picture order count). Therefore, the distance is equal to u. The time interval of the next Intra frame corresponds to frame time for the u frames. A proper threshold for the distance or time interval of the next Intra frame can be selected.

In yet another example, the encoding status is related to the previous Intra frame. Let the current frame index is n and the previous Intra frame index is (n−v) according to the first frame type structure, where v is a positive integer. The encoder status corresponds to whether the distance or time interval of the previous Intra frame is smaller than a threshold. If the distance or time interval of the previous Intra frame is smaller than a threshold, the check result is true. Otherwise, the check result is false. The distance can be measured in terms of POC. Therefore, the distance is equal to v. The time interval of the next Intra frame corresponds to frame time for the v frames. A proper threshold for the distance or time interval of the previous Intra frame can be selected.

In yet another example, the encoding status is related to the transmission latency of the indication of picture data loss. If an indication of picture data loss is triggered due to decoding error in frame N and the encoder may be processing frame M, the transmission latency is the time between encoding frame N and frame M (i.e., M–N). If the transmission latency of the indication of picture data loss is smaller than a threshold, the check result is true. Otherwise, the check result is false. A proper threshold for the transmission latency of the indication of picture data loss can be selected.

In yet another example, the encoding status is related to the current bitrate available for video bitstream. If the current bitrate available for video bitstream is smaller than a threshold, the check result is true. Otherwise, the check result is false. A proper threshold for the transmission latency of the indication of picture data loss can be selected.

The encoder can initially set the check result to be true. The thresholds used in various examples above can be set before encoding a frame starts and these thresholds will stay the same during encoding a frame.

Third Embodiment

In this embodiment, the encoder is also allowed to use at least two reference frame structures and two frame-type structures: a first reference frame structure, a second reference frame structure, a first frame type structure and a second frame type structure to encode frames. The reference structure describes the reference frame(s) of specific frames. The first frame type structure includes at least one Intra frame (e.g. I frame) and one inter frame (e.g. P frame). The encoder may use the first reference frame structure with the first frame type structure for normal operation. However, when the encoder receives feedback information from a decoder, the encoder may switch to the second reference frame structure with the second frame type structure according to the current encoding status. In particular, the feedback information from a decoder corresponds to an indication of picture data loss. The indication of picture data loss is associated with the loss of a defined/known amount of coded video data belonging to one or more pictures.

The first frame type structure according to this embodiment supports Intra coded frames. The arrangement of frame type can be the same as that for the second embodiment. For example, the first frame type structure shown in FIG. 4 can be used for the third embodiment. Similarly, the minimum and maximum Intra frame periods can be 25 and 30 frames respectively. Furthermore, the video encoder may encode frames with only the first encoded frame as an Intra frame.

The second frame type structure used for the second embodiment can be used for the third embodiment. For example, the second frame type structure shown in FIG. 5 and FIG. 6 can be used for the third embodiment.

Various encoding statuses can be checked and used to determine the second frame type structure. For example, the status checking for the second embodiment mentioned above is also applicable to the third embodiment. Furthermore, if the previous v-th frame is an Intra frame and at least one frame with possible decoding data corruption is encoded or decoded before the previous v-th frame, then the check result is true. Otherwise, the check result is false.

Figure 7:
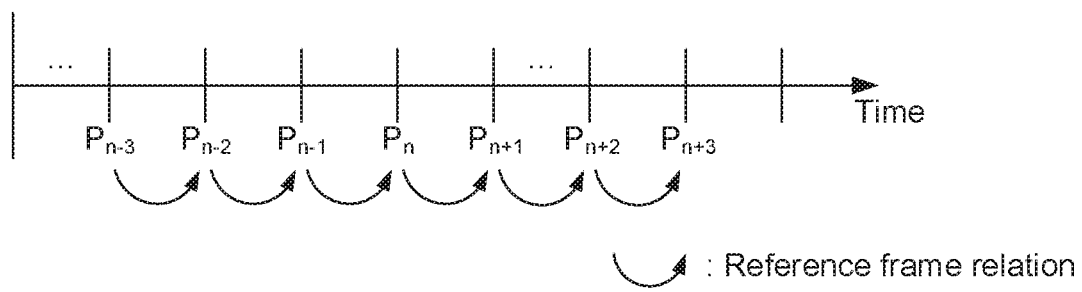
FIG. 7 illustrates an example of first reference frame structure, where $P_n$ is a P frame with frame index n, and $P_n$ is the reference frame of $P_{n+1}$.

The arrangement of the first reference frame structure is used before the indication of picture data loss is received. FIG. 7 illustrates an example of first reference frame structure, where $P_n$ is a P frame with frame index n, and $P_n$ is the reference frame of $P_{n+1}$.

Upon receiving the indication of picture data loss, the encoding status can be checked for the selection of the second reference frame structure. The selection of the second reference frame structure can be based on another encoding status (referred as second encoding status) that may be different from the encoding status used for selection of the second frame type structure. The second reference frame structure can be equal to the first reference frame structure when the second check result is true. In this case, the indication of picture data loss is ignored. On the other hand, the second reference frame structure is different from the first reference frame structure when the second check result is false. For the second reference frame structure, the encoder will determines the frame index before one or more frames that have possible decoding data corruption and encode the current frame without reference to the one or more frames that have possible decoding data corruption.

Figure 8:
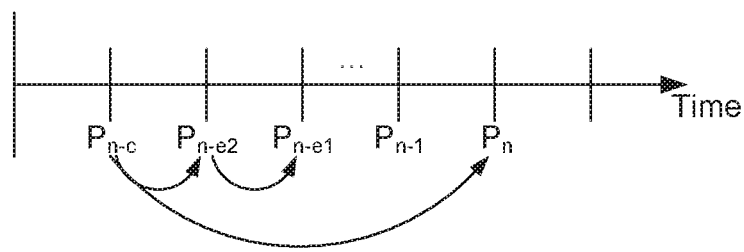
FIG. 8 illustrates an example of the second reference frame structure according to the current embodiment.

FIG. 8 illustrates an example of the second reference frame structure according to the current embodiment. In the second reference frame structure of FIG. 8, at least one frame with picture data loss (for example, $P_{n-e2}$ and $P_{n-e1}$) may be found; wherein $P_{n-e2}$ to $P_{n-1}$ are frames with possible decoding data corruption; and select $P_{n-c}$, which is a frame without picture data loss before $P_{n-e2}$ and $P_{n-e1}$ in the display order or in the decoding order. In the first reference frame structure, $P_{n-1}$ is utilized as the reference frame of $P_n$. In the second reference frame structure, $P_{n-c}$ is utilized as the reference frame of $P_n$.

The frames with possible decoding data corruption may correspond to a first frame set that contains one or more frames with indication of picture data loss, a second frame set that contains one or more frames referencing to at least one frame in the first frame set, a third frame set that contains one or more frames referencing to at least one frame in the second frame set, or a fourth frame set that the ancestor reference frame of the frame in the fourth frame set is a frame in the first frame set. The ancestor reference frame means a reference frame that is not directly referenced by the current frame, and the ancestor reference frame has the reference relation related to the current frame. For example, an ancestor reference frame may correspond to the reference frame of the reference frame of current frame. Accordingly, $P_{n-e2}$ and $P_{n-e1}$ in FIG. 8 are frames with picture data loss. Also, if $P_{n-i}$ in FIG. 7 is a frame with picture data loss, all subsequent P frames are frames with picture data loss.

Most encoder-status checks used for selection of the second frame type structure can be used for the selection of the second reference frame structure. For example, the second encoding status can be related to the distance or time interval of the Intra frame period, the distance or time interval of the next Intra coded frame, or the distance or time interval of the previous Intra coded frame. Respective thresholds can be determined for these encoding statuses. The encoding status can also be related to the transmission latency of the indication of picture data loss.

The second status checking for the third embodiment can also be determined as follows. If the previous v-th frame is an Intra frame and at least one frame with possible decoding data corruption is encoded or decoded before the previous v-th frame, then the second check result is true. Otherwise, the check result is false In another example, the second encoding status is related to the current bitrate available for video bitstream. If the current bitrate available for video bitstream is smaller than a threshold, the check result is true. Otherwise, the check result is false. A proper threshold for the transmission latency of the indication of picture data loss can be selected.

In yet another example, if the frames in reference buffer list may have possible decoding data corruption, then the second check result is true. Otherwise, the second check result is false.

In yet another example, the second encoding status is related to a first frame group and a second frame group, where the first frame group consists of frames with no possible decoding data corruption and the second frame group consists of frames with possible decoding data corruption. If the frame interval between the nearest frame in the first frame group and the current frame is larger than a threshold, then the second check result is true. Otherwise, the second check result is false. The nearest frame in the first frame group means the frame in the first frame group with the shortest distance (in either encoding order or display order) between the frame in the first frame group and the current frame.

The encoder can initially set the second check result to be true. The thresholds can be set before encoding one frame. The threshold can also be a constant value during encoding one frame.

Figure 9:
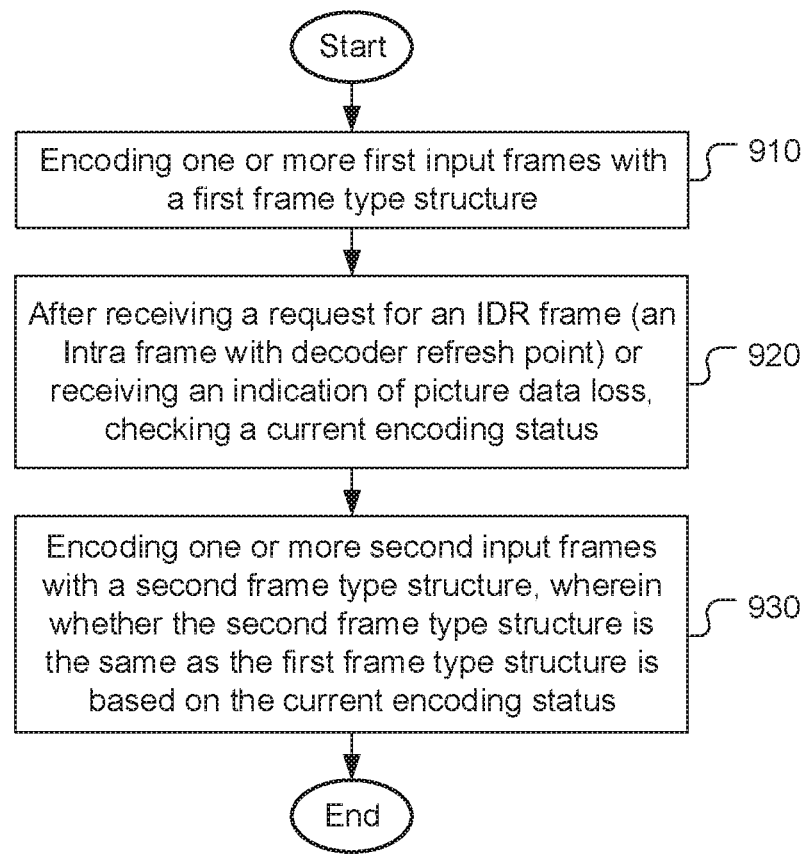
FIG. 9 illustrates an exemplary flowchart of a video encoder, where the frame type structure is adaptively used according to the current encoding status after receiving a request for IDR frame or an indication of picture data loss.

FIG. 9 illustrates an exemplary flowchart of a video encoder, where the frame type structure is adaptively used according to the current encoding status after receiving a request for IDR frame or an indication of picture data loss. The system encodes one or more first input frames with a first frame type structure as shown in step 910. After receiving a request for an IDR frame (an Intra frame with decoder refresh point) or receiving an indication of picture data loss, a current encoding status is checked in step 920. One or more second input frames are encoded with a second frame type structure in step 930, where whether the second frame type structure is the same as the first frame type structure is based on the current encoding status.

Figure 10:
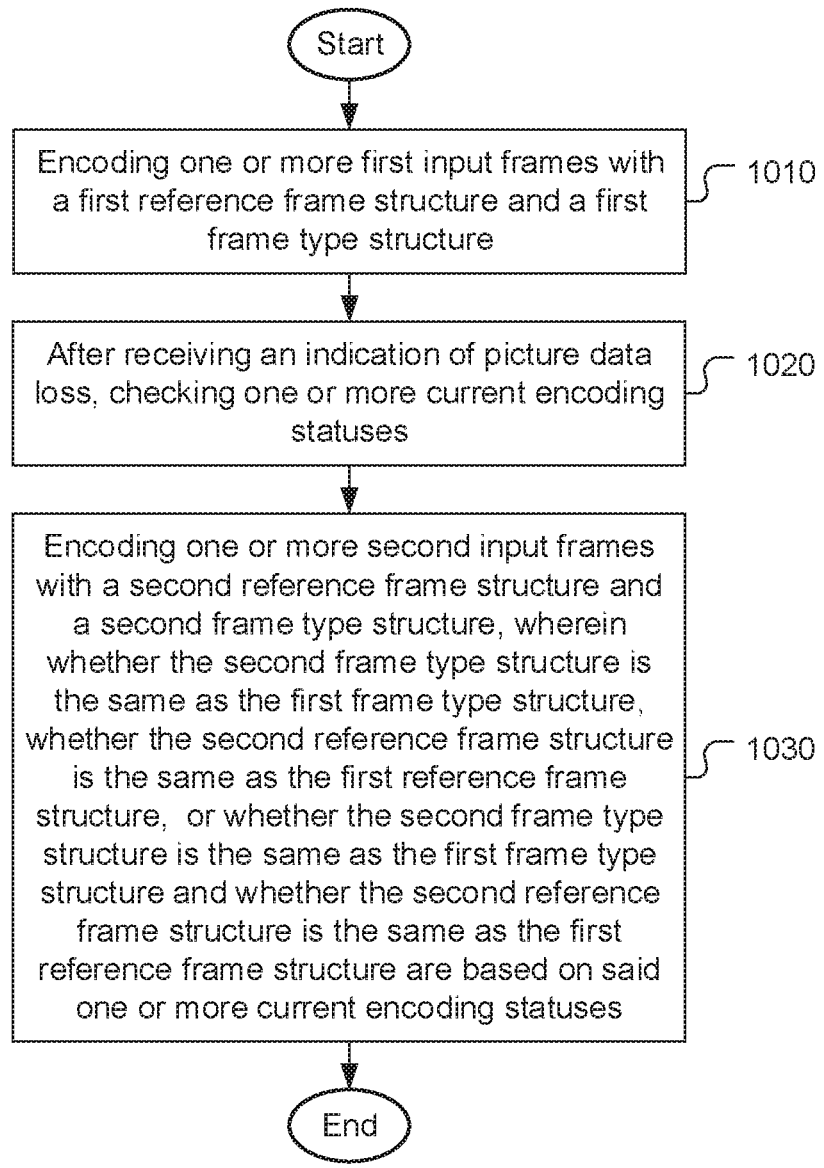
FIG. 10 illustrates an exemplary flowchart of a video encoder, where the reference frame structure and the frame type structure are adaptively used according to the current encoding status after receiving an indication of picture data loss.

FIG. 10 illustrates an exemplary flowchart of a video encoder, where the reference frame structure and the frame type structure are adaptively used according to the current encoding status after receiving an indication of picture data loss. The system encodes one or more first input frames with a first reference frame structure and a first frame type structure as shown in step 1010. After receiving an indication of picture data loss, one or more current encoding statuses are checked in step 1020. One or more second input frames are encoded with a second reference frame structure and a second frame type structure in step 1030, where whether the second frame type structure is the same as the first frame type structure, whether the second reference frame structure is the same as the first reference frame structure, or whether the second frame type structure is the same as the first frame type structure and whether the second reference frame structure is the same as the first reference frame structure are based on said one or more current encoding statuses.

The flowchart shown above is intended to illustrate examples of video coding incorporating an embodiment of the present invention. A person skilled in the art may modify each step, re-arranges the steps, split a step, or combine the steps to practice the present invention without departing from the spirit of the present invention.

The above description is presented to enable a person of ordinary skill in the art to practice the present invention as provided in the context of a particular application and its requirement. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

Embodiment of the present invention as described above may be implemented in various hardware, software codes, or a combination of both. For example, an embodiment of the present invention can be a circuit integrated into a video compression chip or program code integrated into video compression software to perform the processing described herein. An embodiment of the present invention may also be program code to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware code may be developed in different programming languages and different formats or styles. The software code may also be compiled for different target platforms. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method of video encoding performed by a video encoder with feedback information from a decoder, the method comprising:
   encoding one or more first input frames with a first frame type structure, which includes at least one Intra frame with decoder refresh point (IDR frame); and
   in response to receiving feedback information from a decoder corresponding to a request for an IDR frame or an indication of picture data loss:
   checking a current encoding status;
   determining whether a second frame type structure is the same as the first frame type structure based on the current encoding status; and
   encoding one or more second input frames, next in sequence with respect to the one or more first input frames, with the second frame type structure such that the IDR frame is encoded earlier than would have been encoded using the first frame type structure, wherein whether the second frame type structure is the same as the first frame type structure is based on the current encoding status.

2. The method of claim 1, wherein the indication of picture data loss comprises an indication of loss of an undefined/unknown amount of coded video data belonging to one or more pictures or an indication of loss of a defined/known amount of coded video data belonging to one or more pictures.

3. The method of claim 1, wherein if a check result of the current encoding status is true, the second frame type structure is the same as the first frame type structure; and if the check result of the current encoding status is false, the second frame type structure is different from the first frame type structure.

4. The method of claim 3, wherein if a transmission latency of receiving the request for the IDR frame, a transmission latency of receiving the indication of picture data loss, or a current bitrate available for video bitstream is smaller than a threshold, the check result of the current encoding status is true, and otherwise the check result of the current encoding status is false.

5. The method of claim 3, wherein if a frame interval or time interval of a minimum frame period of Intra frames, a frame interval or time interval between a current frame and a next Intra frame, or a frame interval or time interval between the current frame and a previous Intra frame is smaller than a threshold, the check result of the current encoding status result is true, and otherwise the check result of the current encoding status is false.

6. The method of claim 5, wherein each Intra frame, each next Intra frame or each previous Intra frame corresponds to one Intra frame with or without a decoder refresh point.

7. The method of claim 3, wherein the check result of the current encoding status is always set to true.

8. The method of claim 3, wherein the check result of the current encoding status is determined by comparing the current encoding status with a threshold, and wherein the threshold is set to a value before encoding one frame and remain constant during encoding one frame.

9. The method of claim 1, wherein the first frame type structure comprises Intra frames and predictive-coded (P) frames, and wherein the Intra frames have a minimum Intra period, or both the minimum Intra period and a maximum Intra period and a maximum Intra period, and wherein the Intra frame corresponds to one Intra frame with or without a decoder refresh point.

10. The method of claim 9, wherein an actual Intra frame period is determined by a video encoder or an external device without information regarding the indication of picture data loss.

11. The method of claim 1, wherein only a beginning encoded frame of the first frame type structure is an IDR frame or an Intra frame without a decoder refresh point respectively.

12. The method of claim 1, wherein if the second frame type structure is different from the first frame type structure, the second frame type structure corresponds to changing one predictive-coded (P) frame prior to a next Intra frame according to the first frame type structure into an altered Intra frame and encoding remaining frames according to the second frame type structure in a same way as the first frame type structure, and wherein each next Intra frame or each altered Intra frame corresponds to one Intra frame with or without a decoder refresh point.

13. The method of claim 1, wherein if the second frame type structure is different from the first frame type structure, the second frame type structure corresponds to changing one predictive-coded (P) frame prior to a next Intra frame according to the first frame type structure into an altered Intra frame and encoding a next Intra after k frames from the altered Intra frame, and wherein k is larger than a minimum Intra frame period according to the first frame type structure or video encoding setting, and wherein each next Intra frame or each altered Intra frame corresponds to one Intra frame with or without a decoder refresh point.

14. An apparatus of video encoding performed by a video encoder with feedback information from a decoder, the apparatus comprising one or more electronic circuits of processors arranged to:
encode one or more first input frames with a first frame type structure, which includes at least one Intra frame with decoder refresh point (IDR frame); and
in response to receiving feedback information from a decoder corresponding to a request for an IDR frame or an indication of picture data loss:
check a current encoding status; and
encode one or more second input frames, next in sequence with respect to the one or more first input frames, with a second frame type structure such that the IDR frame is encoded earlier than would have been encoded using the first frame type structure, wherein whether the second frame type structure is the same as the first frame type structure is based on the current encoding status.

15. A method of video encoding performed by a video encoder with feedback information from a decoder, the method comprising:
encoding one or more first input frames with a first reference frame structure and a first frame type structure, which includes at least one Intra frame with decoder refresh point (IDR frame); and
in response to receiving feedback information from a decoder corresponding to an indication of picture data loss:
checking one or more current encoding statuses; and
encoding one or more second input frames, next in sequence with respect to the one or more first input frames, with a second reference frame structure and a second frame type structure based on said one or more current encoding statuses such that the IDR frame is encoded earlier than would have been encoded using the first frame type structure.

16. The method of claim 15, wherein if a previous v-th frame is an Intra coded frame and at least one frame with possible decoding data corruption is encoded/decoded before encoding or decoding the previous v-th frame, then a first check result of said one or more current encoding statuses is true; and otherwise the first check result of said one or more current encoding statuses is false, wherein if the first check result of said one or more current encoding statuses is true, the second frame type structure is the same as the first frame type structure; and if the first check result of said one or more current encoding statuses is false, the second frame type structure is different from the first frame type structure.

17. The method of claim 15, wherein the first reference frame structure comprises one or more previous decoded frames for a given frame.

18. The method of claim 15, wherein if a second check result of said one or more current encoding statuses is true, the second reference frame structure is the same as the first reference frame structure; and if the second check result of said one or more current encoding statuses is false, the second reference frame structure is different from the first reference frame structure.

19. The method of claim 18, further comprising, when the second check result of said one or more current encoding statuses is false, deriving a frame index before one or more frames having possible decoding data corruption, and encoding one current second input frame without referencing to any frame having said possible decoding data corruption.

20. The method of claim 19, wherein said one or more frames having said possible decoding data corruption comprise a first frame set that contains one or more frames with the indication of picture data loss, a second frame set that contains one or more frames referencing to said one or more frames in the first frame set, a third frame set that contains one or more frames referencing to said one or more frames in the second frame set, a fourth frame set where one or more ancestor reference frames of one frame in the fourth frame set is one frame in the first frame set, or any combination thereof.

21. The method of claim 18, wherein the second check result of said one or more current encoding statuses is true if a frame interval or time interval of a minimum Intra frame period, a frame interval or time interval of a next Intra frame, or a frame interval or time interval of a previous Intra frame according to the first frame type structure is smaller than a threshold, and otherwise the second check result of said one or more current encoding statuses is false.

22. The method of claim 18, wherein a transmission latency of receiving the indication of picture data loss or a current bitrate available for video bitstream is smaller than a threshold, the second check result of said one or more current encoding statuses is true, and otherwise the second check result of said one or more current encoding statuses is false.

23. The method of claim 18, wherein if one frame in a reference buffer list has possible decoding data corruption, the second check result of said one or more current encoding statuses is true; and otherwise the second check result of said one or more current encoding statuses is false.

24. The method of claim 18, wherein if a reference buffer list comprises a first frame group without possible decoding data corruption and a second frame group with said possible decoding data corruption and if a frame interval between a nearest frame in the first frame group and a current frame is larger than a threshold, the second check result of said one or more current encoding statuses is true; and otherwise the second check result of said one or more current encoding statuses is false.

25. The method of claim 18, wherein the second check result of said one or more current encoding statuses is determined by comparing the current encoding status with a threshold, and wherein the threshold is always set to true, or set to a value before encoding one frame and remain constant during encoding one frame.

26. An apparatus of video encoding performed by a video encoder with feedback information from a decoder, the apparatus comprising one or more electronic circuits of processors arranged to:
encode one or more first input frames with a first reference frame structure and a first frame type structure, wherein the first frame type structure includes at least one Intra frame with decoder refresh point (IDR frame); and
in response to receiving feedback information from a decoder corresponding to an indication of picture data loss:
check one or more current encoding statuses; and
encode one or more second input frames, next in sequence with respect to the one or more first input frames, with a second reference frame structure and a second frame type structure based on said one or more current encoding statuses such that the IDR frame is encoded earlier than would have been encoded using the first frame type structure.

* * * * *